United States Patent
Nii et al.

(10) Patent No.: US 8,076,433 B2
(45) Date of Patent: Dec. 13, 2011

(54) VINYL ALCOHOL-BASED POLYMER AND FILM CONTAINING THE SAME

(75) Inventors: Shinsuke Nii, Kurashiki (JP); Masato Nakamae, Kurashiki (JP); Makio Tokoh, Tokyo (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 26 days.

(21) Appl. No.: 12/810,626

(22) PCT Filed: Aug. 25, 2009

(86) PCT No.: PCT/JP2009/064780
§ 371 (c)(1),
(2), (4) Date: Jun. 25, 2010

(87) PCT Pub. No.: WO2010/024245
PCT Pub. Date: Mar. 4, 2010

(65) Prior Publication Data
US 2010/0280202 A1 Nov. 4, 2010

(30) Foreign Application Priority Data

Aug. 27, 2008 (JP) .................... 2008-217658
Mar. 18, 2009 (JP) .................... 2009-065331

(51) Int. Cl.
*C08F 18/02* (2006.01)
*C08F 16/06* (2006.01)

(52) U.S. Cl. .................... 526/304; 526/319

(58) Field of Classification Search .......... 526/304, 526/319
See application file for complete search history.

(56) References Cited

U.S. PATENT DOCUMENTS 5,849,840 A * 12/1998 Maruhashi et al. .......... 525/56
2005/0025913 A1 2/2005 Jikihara et al.

FOREIGN PATENT DOCUMENTS

| JP | 59 155408 | 9/1984 |
|---|---|---|
| JP | 63 168437 | 7/1988 |
| JP | 01 158016 | 6/1989 |
| JP | 2001-019720 A | 1/2001 |
| JP | 2003-155306 | 5/2003 |
| JP | 2003-155306 A | 5/2003 |
| JP | 2003 155307 | 5/2003 |
| JP | 2004 075870 | 3/2004 |
| JP | 2005 42008 | 2/2005 |
| JP | 2005-294339 | 10/2005 |
| WO | WO 2005/073311 A1 | 8/2005 |

OTHER PUBLICATIONS

STIC EIC search.*
Supplementary European Search Report issued Sep. 29, 2010 in Application No. 09 809 896 filed Aug. 25, 2009.
Supplementary European Search Report issued Sep. 29, 2010 in Application No. 09 809 896.5 filed Aug. 25, 2009.

* cited by examiner

*Primary Examiner* — Ling Choi
*Assistant Examiner* — Chun-Cheng Wang
(74) *Attorney, Agent, or Firm* — Oblon, Spivak, McClelland, Maier & Neustadt, L.L.P.

(57) ABSTRACT

Provided are a polyoxyalkylene modified vinyl alcohol-based polymer, including a polyoxyalkylene group in side chain, wherein the vinyl alcohol-based polymer has a viscosity average degree of polymerization P of from 200 to 5000, has a degree of saponification of from 20 to 99.99 mol %, and has an amount S of polyoxyalkylene modification of from 0.1 to 10 mol % and a film containing the same. By way of them, a polyvinyl alcohol-based polymer that is soluble in water and also high in viscosity, and a film that is less in a decrease of tensile elastic modulus when conditioned in high humidity, is excellent in water repellency on the film surface, and exhibits water solubility are provided.

10 Claims, No Drawings

VINYL ALCOHOL-BASED POLYMER AND FILM CONTAINING THE SAME

TECHNICAL FIELD

The present invention relates to a polyoxyalkylene modified vinyl alcohol-based polymer and a film containing the same. More specifically, it relates to a polyoxyalkylene modified vinyl alcohol-based polymer that is soluble in water and has high viscosity. And, it relates to a film that is low in moisture content and is less in a decrease of tensile elastic modulus, when conditioned in high humidity, compared to a conventional vinyl alcohol-based polymer film. Furthermore, the film has high water repellency on a film surface and high water solubility, compared to a conventional vinyl alcohol-based polymer film.

BACKGROUND ART

Since vinyl alcohol-based polymers (hereinafter, may be abbreviated as PVA) have excellent interfacial properties and strength properties as one of the few crystalline water soluble polymers, they are utilized in various binders, paper processing, fiber processing, stabilizers for emulsion and also occupies an important position as a material for PVA-based films, PVA-based fibers, and the like. Meanwhile, they are also sought for higher functionality to improve specific performances by controlling the crystallinity or introducing functional groups, and a variety of so-called modified PVAs are developed as well.

Among all, a variety of PVAs having a polyoxyalkylene group (hereinafter, may be abbreviated as a POA group) are developed. For example, in Patent Document 1, a method of synthesizing PVA having a POA group is disclosed that is carried out by saponifying a copolymer of a vinyl ester and polyoxyalkylene (hereinafter, may be abbreviated as POA) having an allyl group at an end, a methacrylic ester having a POA group, or a methacrylamide group containing compound having a POA group on a nitrogen atom, and after that PVAs having a POA group have come to be utilized for a variety of applications. For example, its utility as a dispersion stabilizer in Patent Document 2 and its utility as a resin for melt molding in Patent Document 3 are disclosed respectively.

Most of the PVA having a POA group that have been utilized in the past have a POA group with an alkylene unit of ethylene, and such principles have been utilized that a polyoxyethylene group imparts interfacial properties and strength properties to PVA and suppresses crystallinity of PVA.

Meanwhile, Patent Document 4 discloses that an aqueous solution of PVA having a polyoxypropylene group as a POA group, in a case of a certain number or more of oxyalkylene repeating units, has a high viscosity and also expresses a rise in viscosity accompanied by a rise in temperature. Side chain of polyoxypropylene modified PVA is more hydrophobic compared with side chain of polyoxyethylene modified PVA, and the intermolecular interaction of polyoxypropylene with each other functions in water, and thereby such physical properties mentioned above are considered to be obtained.

However, since the intermolecular interaction of polyoxypropylene with each other is not so strong in an aqueous solution of PVA having a polyoxypropylene group, such an approach of increasing the POA group content or increasing the concentration of the aqueous PVA solution is necessary to obtain a highly viscous aqueous PVA solution, and POA modified PVA which provides high viscosity of the aqueous PVA solution with a lower content has been demanded.

Meanwhile, making use of the synthesis method described in Patent Document 1, for example, a film for packaging alkaline substances and a flexible water resistant film in which heat treatment of the film is devised are proposed respectively in Patent Document 5 and Patent Document 6.

Here, most of the polyoxyalkylene groups disclosed in Patent Documents 1, 5, and 6 are a polyoxyethylene group and polyoxypropylene is disclosed only partly. This signifies that, since these Patent Documents are intended to obtain a polymer or a film having excellent water solubility at low temperatures, ethylene or propylene, which has a less carbon number, is selected as alkylene.

However, although the PVA containing a polyoxyethylene group or a polyoxypropylene group and films thereof disclosed in Patent Documents 1, 5, and 6 are excellent in water solubility at low temperatures, they have problems of easy absorption of moisture and a serious decrease in the elastic modulus of the films while leaving the films in high humidity. While they are excellent in water solubility, they have high affinity for water, so that they have a problem that they are low in the water repellency when water droplets are attached on the film surface, for example, and the attached portions shrink easily to be prone to become a defect.

PRIOR ART DOCUMENTS

Patent Documents

[Patent Document 1] JP 59-155408A
[Patent Document 2] JP 2004-75870A
[Patent Document 3] JP 2003-155307A
[Patent Document 4] JP 2005-42008A
[Patent Document 5] JP 63-168437A
[Patent Document 6] JP 1-158016A

SUMMARY OF THE INVENTION

Problems to be Solved by the Invention

The present invention has made to solve the problems and provides a vinyl alcohol-based polymer soluble in water and also high in viscosity. In addition, it provides a film that is low in moisture content and is less in a decrease of tensile elastic modulus when conditioned in high humidity, is excellent in the water repellency on the film surface, and exhibits water solubility.

Means for Solving the Problems

The problems are solved by providing a polyoxyalkylene modified vinyl alcohol-based polymer, comprising a polyoxyalkylene group represented by the following general formula (I) in side chain, wherein the vinyl alcohol-based polymer has a viscosity average degree of polymerization P of from 200 to 5000, has a degree of saponification of from 20 to 99.99 mol %, and has an amount S of polyoxyalkylene modification of from 0.1 to 10 mol %.

[chem. 1]

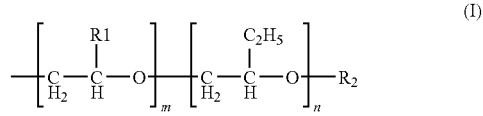

(wherein R1 denotes a hydrogen atom or a methyl group, and R2 denotes a hydrogen atom or an alkyl group having a carbon number of from 1 to 8; and m and n denote a number of repeating units of respective oxyalkylene units and are $1 \leq m \leq 10$ and $3 \leq n \leq 20$).

In this regard, it is preferred that the polyoxyalkylene modified vinyl alcohol-based polymer contains from 2.5 to 50 parts by weight of a monomer having a polyoxyalkylene group represented by the general formula (I). It is also preferred that the polyoxyalkylene modified vinyl alcohol-based polymer has a degree of saponification of from 80 to 99.99 mol %, and even more preferred from 98 to 99.99 mol %. It is also preferred that the polyoxyalkylene modified vinyl alcohol-based polymer has a viscosity average degree of polymerization P of from 500 to 5000.

The problems are also solved by providing a film containing the polyoxyalkylene modified vinyl alcohol-based polymer. In this regard, it is preferred that a contact angle to water is 65° or more.

The problems are also solved by providing a method of producing the polyoxyalkylene modified vinyl alcohol-based polymer, comprising: copolymerizing an unsaturated monomer represented by the following general formula (II) and a vinyl ester-based monomer; and saponifying a polyoxyalkylene modified vinyl ester-based copolymer thus obtained.

[chem. 2]

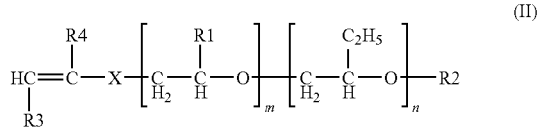

(II)

(wherein R1, R2, m, and n are same as those in the general formula (I); R3 denotes a hydrogen atom or a —COOM group, where M denotes a hydrogen atom, an alkali metal, or an ammonium group; R4 denotes a hydrogen atom, a methyl group, or a —CH$_2$—COOM group, where M is same as the definition above; and X denotes —O—, —CH$_2$—O—, —CO—, —(CH$_2$)$_k$—, —CO—O—, or —CO—NR5-, where R5 means a saturated alkyl group having a carbon number of from 1 to 4 or a hydrogen atom and k denotes a repeating unit of a methylene unit and is $1 \leq k \leq 15$).

In this regard, it is preferred that the unsaturated monomer represented by the general formula (II) is an unsaturated monomer represented by the following general formula (III).

[chem. 3]

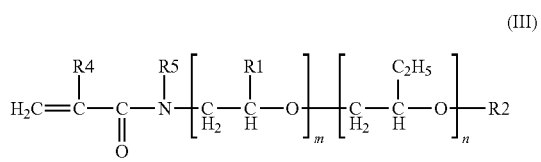

(III)

(wherein R1, R2, R4, R5, m, and n are same as those in the general formula (II)).

Further, the problems are also solved by a method of producing a film comprising forming the film using a polyoxyalkylene modified vinyl alcohol-based polymer obtained by the production method above.

Effects of the Invention

The polyoxyalkylene modified vinyl alcohol-based polymer (hereinafter, may be abbreviated as POA modified PVA) of the present invention has good water solubility, has a high aqueous solution viscosity even in a low concentration region, and further has high surface activity as well. In addition, the film of the present invention is less in a decrease of the tensile elastic modulus when conditioned in high humidity, is also excellent in the water repellency on the film surface, and exhibits water solubility.

MODE FOR CARRYING OUT THE INVENTION

POA modified PVA of the present invention has a POA group represented by the following general formula (I) in side chain.

[chem. 4]

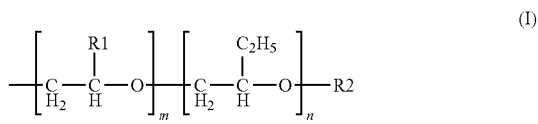

(I)

In the formula, R1 denotes a hydrogen atom or a methyl group, and R2 denotes a hydrogen atom or an alkyl group having a carbon number of from 1 to 8; and m and n denote a number of repeating units of respective oxyalkylene units and are $1 \leq m \leq 10$ and $3 \leq n \leq 20$. Here, a unit having a number of repeating units of m is called as a unit 1, and a unit having a number of repeating units of n is called as a unit 2. The unit 1 and the unit 2 may be arranged in a form of either random or block.

The number m of repeating units of the unit 1 of the POA group represented by the general formula (I) has to be $1 \leq m \leq 10$, more preferably $1 \leq m \leq 5$, and particularly preferably $1 \leq m \leq 2$. In a case of m being 0, the hydrophobicity of the POA unit becomes high and the water solubility of the POA modified PVA decreases. The number n of repeating units of the unit 2 has to be $3 \leq n \leq 20$, preferably $5 \leq n \leq 18$, and particularly preferably $8 \leq n \leq 15$. In a case of n being less than 3, the interaction of POA groups with each other does not occur and the viscosity of the aqueous POA modified PVA solution is low. In addition, in a film containing this POA modified PVA, the water solubility is good while the absorption of moisture increases in high humidity and the water repellency decreases. Meanwhile, in a case of n exceeding 20, the hydrophobicity of the POA group becomes high and the water solubility of POA modified PVA and a film containing the same decreases.

As long as POA modified PVA of the present invention has a POA group represented by the general formula (I) in side chain, a method of producing the POA modified PVA is not particularly limited. A method is preferred that copolymerizes an unsaturated monomer having a POA group represented by the general formula (I) and a vinyl ester-based monomer and saponifies a POA modified vinyl ester-based copolymer thus obtained. Here, the copolymerization is preferably carried out in an alcoholic solvent or without solvent.

The unsaturated monomer having a POA group represented by the general formula (I) is preferably an unsaturated monomer represented by the following formula (II).

[chem. 5]

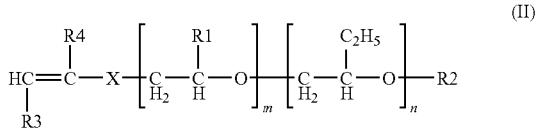

(II)

In the formula, R1, R2, m, and n are same as those in the general formula (I); R3 denotes a hydrogen atom or a —COOM group, where M denotes a hydrogen atom, an alkali metal, or an ammonium group; R4 denotes a hydrogen atom, a methyl group, or a —CH$_2$—COOM group, where M is same as the definition above; and X denotes —O—, —CH$_2$—O—, —CO—, —(CH$_2$)$_k$—, —CO—O—, or —CO—NR5-, where R5 means a saturated alkyl group having a carbon number of from 1 to 4 or a hydrogen atom and k denotes a repeating unit of a methylene unit and is $1 \leq k \leq 15$.

R2 in the unsaturated monomer represented by the general formula (II) is preferably a hydrogen atom, a methyl group, or a butyl group, and is more preferably a hydrogen atom or a methyl group. Further, it is particularly preferred that R1 in the unsaturated monomer represented by the general formula (II) is a hydrogen atom, R2 is a hydrogen atom or a methyl group, and R3 is a hydrogen atom.

For example, in a case of R1 in the general formula (II) being a hydrogen atom, R2 being a hydrogen atom, and R3 being a hydrogen atom, the unsaturated monomer represented by the general formula (II) may specifically include polyoxyethylene polyoxybutylene monoacrylate, polyoxyethylene polyoxybutylene monomethacrylate, polyoxyethylene polyoxybutylene monoacrylamide, polyoxyethylene polyoxybutylene monomethacrylamide, polyoxyethylene polyoxybutylene monoallyl ether, polyoxyethylene polyoxybutylene monomethallyl ether, polyoxyethylene polyoxybutylene monovinyl ether, polyoxypropylene polyoxybutylene monoacrylate, polyoxypropylene polyoxybutylene monomethacrylate, polyoxypropylene polyoxybutylene monoacrylamide, polyoxypropylene polyoxybutylene monomethacrylamide, polyoxypropylene polyoxybutylene monoallyl ether, polyoxypropylene polyoxybutylene monomethallyl ether, and polyoxypropylene polyoxybutylene monovinyl ether. Among all, polyoxyethylene polyoxybutylene monoacrylamide, polyoxyethylene polyoxybutylene monomethacrylamide, and polyoxyethylene polyoxybutylene monovinyl ether are used preferably, and polyoxyethylene polyoxybutylene monomethacrylamide and polyoxyethylene polyoxybutylene monovinyl ether are used particularly preferably.

In a case of R2 in the general formula (II) being an alkyl group having a carbon number of from 1 to 8, the unsaturated monomer represented by the general formula (II) may specifically include unsaturated monomers, exemplified in the above case of R2 in the general formula (II) being a hydrogen atom, in which an OH group at an end is substituted with an alkoxy group having a carbon number of from 1 to 8. Among all, it is preferred to use unsaturated monomers of polyoxyethylene polyoxybutylene monomethacrylamide and polyoxyethylene polyoxybutylene monovinyl ether in which an OH group at an end is substituted with a methoxy group, and it is particularly preferred to use unsaturated monomers of polyoxyethylene polyoxybutylene monomethacrylamide in which an OH group at an end is substituted with a methoxy group.

Among all, it is particularly preferred that the unsaturated monomer represented by the above general formula (II) is an unsaturated monomer represented by the following general formula (III).

[chem. 6]

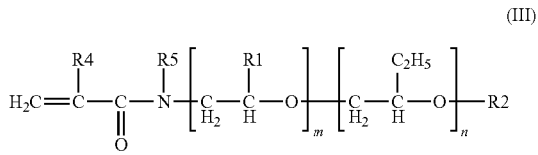

(III)

In the formula, R1, R2, R4, R5, m, and n are same as those in the general formula (II).

The temperature employed when copolymerizing the vinyl ester-based monomer and the unsaturated monomer having a POA group represented by the general formula (I) is preferably from 0° C. to 200° C. and more preferably from 30° C. to 140° C. In a case of the temperature for copolymerizing lower than 0° C., it is difficult to obtain a sufficient rate of polymerization. In a case of the temperature for polymerization higher than 200° C., it is difficult to obtain POA modified PVA having an amount of POA modification defined in the present invention. A method of controlling the temperature employed for copolymerization from 0° C. to 200° C. may include, for example, a method of balancing heat generation due to polymerization and heat release from a surface of a reactor by controlling the rate of polymerization and a method of controlling with an external jacket using an appropriate heating medium, and the latter method is preferred from a perspective of safety.

The mode of polymerization used for copolymerizing a vinyl ester-based monomer and an unsaturated monomer having a POA group represented by the general formula (I) may be any of batch polymerization, semi-batch polymerization, continuous polymerization, and semi-continuous polymerization. The method of polymerization can use an arbitrary known method, such as a bulk polymerization method, a solution polymerization method, a suspension polymerization method, and an emulsion polymerization method. Among them, a bulk polymerization method and a solution polymerization method, in which polymerization is carried out without solvent or in an alcoholic solvent, are preferably employed, and in a case of being intended to producing a copolymer with a high degree of polymerization, an emulsion polymerization method is employed. Although methyl alcohol, ethyl alcohol, propyl alcohol, and the like can be used as an alcoholic solvent, it is not limited to them. These solvents can also be used by combining two or more types.

As an initiator used for copolymerization, a conventionally known azo initiator, a peroxide initiator, a redox initiator, or the like are selected appropriately depending on the method of polymerization. The azo initiator may include 2,2'-azobisisobutyronitrile, 2,2'-azobis (2,4-dimethylvaleronitrile), and 2,2'-azobis(4-methoxy-2,4-dimethylvaleronitrile), and the peroxide initiator may include percarbonate compounds, such as diisopropyl peroxydicarbonate, di-2-ethylhexyl peroxydicarbonate, and diethoxyethyl peroxydicarbonate; perester compounds, such as t-butylperoxy neodecanoate, α-cumylperoxy neodecanoate, and t-butylperoxy decanoate; acetylcyclohexylsulfonyl peroxide; and 2,4,4-trimethylpentyl-2-peroxyphenoxyacetate. Further, it is also possible to make the initiator by combining potassium persulfate, ammonium persulfate, hydrogen peroxide, and the like with the initiators mentioned above. The redox initiator may include combinations of the peroxides mentioned above with a reducing agent, such as sodium hydrogen sulfite, sodium hydrogen carbonate, tartaric acid, L-ascorbic acid, and rongalite.

In a case of copolymerizing a vinyl ester-based monomer and an unsaturated monomer having a POA group represented by the general formula (I) at a high temperature, since coloring or the like may be appeared in PVA caused by decomposition of the vinyl ester-based monomer, there is no harm to add approximately from 1 to 100 ppm (in terms of the vinyl ester-based monomer) of an antioxidant, such as tartaric acid, to the polymerization system for the purpose of prevention of the coloring in that case.

The vinyl ester-based monomer may include vinyl formate, vinyl acetate, vinyl propionate, vinyl butyrate, vinyl isobutyrate, vinyl pivalate, vinyl versatate, vinyl caproate, vinyl caprylate, vinyl laurate, vinyl palmitate, vinyl stearate, vinyl oleate, and vinyl benzoate, and among all, vinyl acetate is most preferred.

Upon copolymerization of the vinyl ester-based monomer and the unsaturated monomer having a POA group represented by the general formula (I), there is no harm to copolymerize another monomer without impairment of the spirit of the present invention. The monomer allowed for use may include, for example, α-olefins, such as ethylene, propylene, n-butene, and isobutylene; acrylic acid and salts thereof; acrylic esters, such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, and octadecyl acrylate; methacrylic acid and salts thereof; methacrylic esters, such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, and octadecyl methacrylate; acrylamide; acrylamide derivatives, such as N-methylacrylamide, N-ethylacrylamide, N,N-dimethylacrylamide, diacetoneacrylamide, acrylamide propane sulfonic acid and salts thereof, acrylamidopropyl dimethylamine and salts thereof or quaternary salts thereof, and N-methylolacrylamide and derivatives thereof; methacrylamide; methacrylamide derivatives, such as N-methylmethacrylamide, N-ethylmethacrylamide, methacrylamide propane sulfonic acid and salts thereof, methacrylamidopropyl dimethylamine and salts thereof or quaternary salts thereof, N-methylolmethacrylamide and derivatives thereof; vinyl ethers, such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether, and 2,3-diacetoxy-1-vinyloxypropane; nitriles, such as acrylonitrile and methacrylonitrile; vinyl halides, such as vinyl chloride and vinyl fluoride; vinylidene halides, such as vinylidene chloride and vinylidene fluoride; allyl compounds, such as allyl acetate, 2,3-diacetoxy-1-allyloxypropane, and allyl chloride; unsaturated dicarboxylic acids, such as maleic acid, itaconic acid, and fumaric acid, and salts thereof or esters thereof; vinylsilyl compounds, such as vinyltrimethoxysilane; and isopropenyl acetates.

In addition, upon copolymerization of the vinyl ester-based monomer and the unsaturated monomer having a POA group represented by the general formula (I), there is no harm to copolymerize in the presence of a chain transfer agent for the purposes of adjusting the degree of polymerization of the copolymer to be obtained and the like without impairment of the spirit of the present invention. The chain transfer agent may include aldehydes, such as acetaldehyde and propionaldehyde; ketones, such as acetone and methylethylketone; mercaptans, such as 2-hydroxyethanethiol; hydrocarbon halides, such as trichloroethylene and perchloroethylene; and phosphinates, such as sodium phosphinate monohydrate, and among all, aldehydes and ketones are used preferably. Although an amount of adding the chain transfer agent is determined depending on the chain transfer constant of the chain transfer agent to be added and the degree of polymerization of the intended vinyl ester-based polymer, it is desirably from 0.1 to 10 weight % in terms of the vinyl ester-based monomer in general.

To the saponification reaction of a POA modified vinyl ester-based copolymer, a conventionally known alcoholysis reaction or hydrolysis reaction using a basic catalyst, such as sodium hydroxide, potassium hydroxide, and sodium methoxide, or an acidic catalyst, such as P-toluenesulfonic acid, can be applied. The solvent allowed for use of this reaction may include alcohols, such as methanol and ethanol; esters, such as methyl acetate and ethyl acetate; ketones, such as acetone and methylethylketone; and aromatic hydrocarbons, such as benzene and toluene, and they can be used singly or in combination with two or more types. Among all, it is convenient and preferred to carry out a saponification reaction using methanol or a mixed solution of methanol/methyl acetate as a solvent and sodium hydroxide as a catalyst.

The POA modified PVA of the present invention has to have an amount S of POA modification of from 0.1 to 10 mol %. When the amount S of POA modification exceeds 10 mol %, the proportion of hydrophobic groups contained per POA modified PVA molecule becomes high and the water solubility of the PVA may decrease. Meanwhile, in a case that the amount S of POA modification is less than 0.1 mol %, although the water solubility of the POA modified PVA is excellent, the number of POA units contained in the PVA is less and the physical properties based on POA modification may not be expressed.

The amount S of POA modification is expressed in mole fractions of POA groups in terms of the main chain methylene groups of the PVA. The lower limit of the amount S of POA modification is preferably 0.1 mol % or more, and more preferably 0.2 mol % or more. The upper limit of the amount S of POA modification is preferably less than 2 mol %, and more preferably 1.5 mol % or less.

The amount S of POA modification of POA modified PVA can be obtained from the proton NMR of polyoxyalkylene modified vinyl ester, which is a precursor of the POA modified PVA. Specifically, POA modified vinyl ester is sufficiently reprecipitation purified with n-hexane/acetone three times or more, followed by drying at 50° C. under reduced pressure for two days to produce a sample of POA modified vinyl ester for analysis. The sample is dissolved in $CDCl_3$ to be measured at room temperature using a proton NMR at 500 MHz (JEOL GX-500). The amount S of POA modification is calculated from a peak α (from 4.7 to 5.2 PPm) derived from main chain methine in the vinyl ester and a peak β (from 0.8 to 1.0 PPm) derived from a methyl group at an end of the unit 2 using the following expression. In the expression, n denotes a number of repeating units of the unit 2.

$$S(\text{mol }\%) = \{(\text{number of protons at }\beta/3n)/(\text{number of protons at }\alpha + (\text{number of protons at }\beta/3n))\} \times 100$$

The viscosity average degree of polymerization P of POA modified PVA is measured according to JIS-K6726. That is, it is obtained by the following expression from limiting viscosity [η] measured, after resaponifying and purifying the PVA, in water at 30° C. A viscosity average degree of polymerization may be called simply as a degree of polymerization.

$$P = ([\eta] \times 10^3/8.29)^{(1/0.62)}$$

The degree of polymerization of POA modified PVA of the present invention is from 200 to 5000. When the degree of polymerization exceeds 5000, the productivity of the POA modified PVA decreases and the water solubility (rate of dissolution) of a film of the POA modified PVA decreases, and thus it is not practical. In a case of the degree of polymerization of less than 200, the mechanical strength of a film of the POA modified PVA decreases and may not be of practical use. The degree of polymerization is preferably 500 or more. When it is less than 500, an aqueous solution of high viscosity may not be obtained.

The degree of saponification of POA modified PVA has to be from 20 to 99.99 mol % from the perspectives of the water solubility and water dispersibility, and is preferably from 40 to 99.9 mol %. In a case of the degree of saponification of less than 20 mol %, the water solubility of POA modified PVA decreases and preparation of an aqueous POA modified PVA solution becomes difficult, and when the degree of saponification exceeds 99.99 mol %, production of the POA modified PVA becomes difficult, so that they are not practical. The degree of saponification is more preferably 80 mol % or more, even more preferably 95 mol % or more, and particularly preferably 98 mol % or more. In a case of producing a film from the POA modified PVA, it is preferably 80 mol % or more from the perspective of the water solubility of the film. In a case of less than 80 mol %, it may not be possible to form a film from the aqueous PVA solution, and it is more preferably 85 mol % or more, even more preferably 88 mol % or more, and particularly preferably 90 mol % or more. The degree of saponification of the POA modified PVA is a value obtained by being measured according to JIS-K6726.

The content of the monomer having a POA group represented by the general formula (I) is preferably 50 parts by weight or less, more preferably 30 parts by weight or less, and particularly preferably 15 parts by weight or less. When the content of the POA group exceeds 50 parts by weight, the hydrophobicity of the PVA may become high and the water solubility may decrease. The lower limit of the content is preferably 2.5 parts by weight or more.

Here, the content of the monomer units having a POA group represented by the general formula (I) is a value expressed by parts by weight (fraction by weight) of POA groups represented by the general formula (I) in terms of 100 parts by weight of main chain of PVA and calculated from the amount S of POA modification. Even when the amount S of POA modification is equivalent, as the degree of saponification becomes high or as the repeating units n of the unit 2 becomes greater, the content of the monomer units becomes greater.

When measuring the viscosity of an aqueous 4 weight % solution of the POA modified PVA of the present invention with a BL type viscometer in the condition of the rotation speed of the rotor at 6 rpm, it is preferred that a ratio $\eta_2/\eta_1$ of a viscosity $\eta_2$ at 40° C. to a viscosity $\eta_1$ at 20° C. is 0.8 or more. The viscosity ratio $\eta_2/\eta_1$ is more preferably 1.0 or more, even more preferably 1.5 or more, and particularly preferably 2.0 or more. In a case of the viscosity ratio $\eta_2/\eta_1$ of less than 0.8, the interaction of POA with each other may be less and the physical properties accompanied by the POA modification may not be expressed.

When a viscosity of an aqueous 4 weight % solution of unmodified PVA having similar degrees of polymerization measured in the conditions of 20° C. and the rotation speed of the rotor at 6 rpm is $\eta_3$, POA modified PVA of the present invention has the viscosity ratio of $f_1/\eta_3$ preferably greater than 1.2, more preferably greater than 1.5, even more preferably greater than 2.0, and particularly preferably greater than 5.0. Here, the unmodified PVA having similar degrees of polymerization means unmodified PVA having degrees of polymerization within a range of from 0.95-fold to 1.05-fold of the degree of polymerization of the POA modified PVA.

A film containing the polyoxyalkylene modified vinyl alcohol-based polymer mentioned above is a preferred embodiment of the present invention. Although a method of producing the film is not particularly limited, a method of forming a film of the POA modified PVA is employed by a method of, for example, casting an aqueous solution of the POA modified PVA or melt extruding it in the presence of a plasticizer, such as glycerol and ethylene glycol, and/or water. Here, the film normally contains 50 weight % or more of the POA modified PVA.

Upon forming the film, various plasticizers, surfactants, antifoamers, mold release agents, ultraviolet absorbers, and the like other than those described above may also be blended to the extent not impairing the effects of the present invention. Similarly, to the extent not impairing the effects of the present invention, other water soluble polymers may also be blended, such as known various PVA, starch, carboxymethyl cellulose, methyl cellulose, and hydroxymethyl cellulose.

In a case of the degree of saponification of the POA modified PVA being 98 mol % or more, the contact angle to water of the film containing the POA modified PVA is preferably 65° or more, more preferably 70° or more, and even more preferably 73° or more. In a case of the contact angle to water being less than 65°, the physical properties accompanied by POA modification may not be expressed.

The film containing the POA modified PVA has a less decrease of tensile elastic modulus when conditioned in high humidity, is excellent in water repellency on the film surface, and exhibits water solubility. Therefore, it can be used preferably for applications in water soluble films, such as individual packaging of detergents of, for example, washing powders or synthetic detergents. It can also be used preferably for a sheet for hydraulic transfer that has a print layer for transfer formed on the film surface as means for forming a print layer for the purpose of imparting design properties or improving the surface physical properties to a molded article surface having a stereoscopic surface with convexity and concavity or a curved surface.

EXAMPLES

A detailed description is given below to the present invention by way of Examples and Comparative Examples. In Examples and Comparative Examples below, "parts" and "%" mean on a basis of weight unless otherwise specified.

PVAs (POA modified PVA and unmodified PVA) obtained by the following Production Examples were evaluated in accordance with the methods below.

[Degree of Saponification of PVA]

The degree of saponification of PVA was obtained by a method according to JIS-K6726.

[Solubility of PVA]

Four grams of POA modified PVA was added to 96 g of distilled water at room temperature and stirred for 30 minutes. The aqueous solution of POA modified PVA thus obtained was raised in temperature to 90° C. and kept for stirring for one hour, followed by cooling to room temperature and it was filtered using metal mesh of 105 mmϕ. After filtration, the metal mesh was dried at 105° C. for three hours and cooled to room temperature in a desiccator, and then the weight was measured to obtain the increased weight of the metal mesh after filtration from before. The increased weight of the metal mesh after filtration is defined as a (g) and the insoluble amount was calculated in accordance with the following expression. In the expression used for calculating the insoluble amount, purity (%) is a value obtained by using the following expression.

Purity (%)=Weight (g) of POA Modified PVA Dried at 105° C. for Three Hours/Weight (g) of POA Modified PVA before Drying Insoluble Amount (%)=$a$ (g)/4 (g)×100/purity (%)×100

The insoluble amount calculated in accordance with the expressions above was determined in accordance with the criteria below.
 A: Insoluble Amount less than 0.01%
 B: Insoluble Amount not less than 0.01% and less than 0.1%
 C: Insoluble Amount not less than 0.1% and less than 0.5%
 D: Insoluble Amount not less than 0.5% and less than 1.0%
 E: Insoluble Amount not less than 1.0%
[Viscosity of Aqueous PVA Solution]
 An aqueous PVA solution of 4% concentration was prepared and the viscosity at a temperature of 20° C. or 40° C. at a rotation speed of a rotor of 6 rpm was measured using a BL type viscometer.
[Production of Film]
 A 4% aqueous solution of PVA was prepared, and after casting it on a PET film, it was dried at 20° C. for one week to obtain a film having a thickness of 100 μm.
[Solubility of Film]
 A beaker of 500 ml in which 350 ml of distilled water was added was immersed in a hot water bath controlled at a temperature of 70° C. and it was stirred with a magnetic stirrer tip made of Teflon (registered trademark) having a length of 30 mm at a rotation speed of 150 rpm, into which the film having a thickness of 100 μm obtained above was cut into 50 mm×50 mm and was fed, to determine the situation of dissolution of the film after 15 minutes in the following criteria.
 A: Completely dissolved and no residue was found.
 B: Mostly dissolved but partly residues were found.
 C: Mostly not dissolved and considerable residues were found.
[Equilibrium Moisture Content of Film]
 The film (film of 10 cm×10 cm, approximately) having a thickness of 100 μm obtained above was humidity conditioned at 20° C. and 85% RH for one week, and then the weight was measured (weight A). The film after measurement was dried by a drier at 105° C. for six hours and was cooled to room temperature in a desiccator to measure the weight again (weight B). The equilibrium moisture content was obtained by the expression below and evaluated by the evaluation criteria below.

Equilibrium Moisture Content(%)=(Weight $A$−Weight $B$)/Weight $A$×100

A: less than 15%
 B: not less than 15% and less than 15.5%
 C: not less than 15.5% and less than 16%
 D: not less than 16%
[Measurement of Strength-Elongation of Film]
 The film having a thickness of 100 μm obtained above was cut into a width of 10 mm and was humidity conditioned at 20° C. and 85% RH for one week, followed by strength-elongation measurement in the conditions of a distance between chucks of 50 mm and a tensile rate of 500 mm/minute using an autograph AG-IS manufactured by Shimadzu Corporation to obtain the tensile elastic modulus. Regarding the measurements, each sample was measured five times and the average value was obtained to evaluate by the evaluation criteria below.
 A: not less than 10 kg/mm$^2$
 B: not less than 5 kg/mm$^2$ and less than 10 kg/mm$^2$
 C: not less than 3 kg/mm$^2$ and less than 5 kg/mm$^2$
 D: less than 3 kg/mm$^2$
[Measurement of Contact Angle to Water of Film]
 Among the films having a thickness of 100 μm obtained above, a film of complete saponification (degree of saponification of 98 mol % or more) was humidity conditioned at 20° C. and 65% RH for one week, followed by measurement of the contact angle to a water droplet when dropping a water droplet on the film surface using DropMaster 500 manufactured by Kyowa Interface Science Co., Ltd. The measurement was carried out by a θ/2 method, in which a contact angle was measured 2 seconds after dropping a water droplet to evaluate the water repellency of the film. Regarding the measurements, each sample was measured ten times and the average value was obtained.
<Method of Producing PVA>
 The method of producing PVA used in Examples and Comparative Examples is shown in the following.

Production Example 1

Production of PVA 1

In a reactor of 3 L provided with a stirrer, a reflux condenser tube, a nitrogen introduction tube, a comonomer drop port, and an initiator addition port, 750 g of vinyl acetate, 250 g of methanol, and 3.3 g of an unsaturated monomer having a POA group (monomer A) were charged, and while nitrogen bubbling, inside the system was purged with nitrogen for 30 minutes. A comonomer solution was prepared as a delay solution by dissolving the unsaturated monomer having a POA group (monomer A) in methanol to have a concentration of 20%, and was purged with nitrogen by nitrogen gas bubbling. A raise in temperature of the reactor was started, and when the internal temperature reached at 60° C., 0.25 g of 2,2'-azobisisobutyronitrile (AIBN) was added to start polymerization. While the delay solution was dropped to keep the monomer composition (ratio of vinyl acetate and the monomer A) in the polymerization solution constant, it was polymerized at 60° C. for three hours and then cooled to stop the polymerization. The total amount of the comonomer solution added until stopping the polymerization was 75 ml. The solid content concentration when stopping the polymerization was 24.4%. Subsequently, while occasionally adding methanol at 30° C. under reduced pressure, unreacted vinyl acetate monomers were eliminated to obtain a methanol solution (concentration of 35%) of a POA modified vinyl ester-based copolymer (POA modified PVAc). Further, 55.6 g of an alkaline solution (10% methanol solution of sodium hydroxide) was added to 453.4 g of a methanol solution (100.0 g of POA modified PVAc in the solution) of POA modified PVAc prepared by adding methanol to that for saponification (POA modified PVAc concentration of the saponification solution of 20%, molar ratio of sodium hydroxide in terms of vinyl acetate units in POA modified PVAc of 0.1). Since a gelatinous material was generated approximately one minute after adding the alkaline solution, it was pulverized by a pulverizer and was left at 40° C. for one hour to be proceeded with saponification, followed by adding 500 g of methyl acetate to neutralize residual alkali. After confirming the end of neutralization using a phenolphthalein indicator, a white solid was obtained by filtration, and 2000 g of methanol was added to this and it was left cleansed at room temperature for three hours. After repeating the cleansing operation three times, a white solid obtained by centrifugal deliquoring was left at 65° C. for two days in a drier to obtain POA modified PVA (PVA 1). The degree of polymerization of PVA 1 was 1850, the degree of saponification was 98.74 mol %, and the amount of POA modification was 0.4 mol %.

Production Examples 2 Through 28

Production of PVAs 2 Through 28

Various POA modified PVAs (PVAs 2 through 28) were produced by a method same as that in Production Example 1 other than modifying the amounts of charging vinyl acetate and methanol, the polymerization conditions, such as the type (Table 2) of and the amount of adding the unsaturated monomer having a POA group used for polymerization, and the saponification conditions, such as the concentration of POA modified PVAc during saponification and molar ratio of sodium hydroxide in terms of vinyl acetate units, as shown in Table 1 and Table 2.

Production Example 29

Production of PVA 29

In a reactor of 3 L provided with a stirrer, a reflux condenser tube, a nitrogen introduction tube, and an initiator addition port, 700 g of vinyl acetate and 300 g of methanol were charged, and while nitrogen bubbling, inside the system was purged with nitrogen for 30 minutes. A raise in temperature of the reactor was started, and when the internal temperature reached at 60° C., 0.25 g of 2,2'-azobisisobutyronitrile (AIBN) was add to start polymerization and it was polymerized at 60° C. for three hours and then cooled to stop the polymerization. The solid content concentration when stopping the polymerization was 17.0%. Subsequently, while occasionally adding methanol at 30° C. under reduced pressure, unreacted vinyl acetate monomers were eliminated to obtain a methanol solution (concentration of 30%) of polyvinyl acetate (PVAc). Further, 55.8 g of an alkaline solution (10% methanol solution of sodium hydroxide) was added to 544.1 g of a methanol solution (120.0 g of PVAc in the solution) of PVAc prepared by adding methanol to that for saponification (PVAc concentration of the saponification solution of 20%, molar ratio of sodium hydroxide in terms of vinyl acetate units in PVAc of 0.1). Since a gelatinous material was generated approximately one minute after adding the alkaline solution, it was pulverized by a pulverizer and was left at 40° C. for one hour to be proceeded with saponification, followed by adding 500 g of methyl acetate to neutralize residual alkali. After confirming the end of neutralization using a phenolphthalein indicator, a white solid was obtained by filtration, and 2000 g of methanol was added to this and it was left cleansed at room temperature for three hours. After repeating the cleansing operation three times, a white solid obtained by centrifugal deliquoring was left at 65° C. for two days in a drier to obtain unmodified PVA (PVA 29). The degree of polymerization of PVA 29 was 1700 and the degree of saponification was 98.5 mol %.

Production Examples 30 Through 34

Production of PVAs 30 Through 34

Various unmodified PVAs (PVAs 30 through 34) were produced by a method same as that in Production Example 29 other than modifying the amounts of charging vinyl acetate and methanol and the saponification conditions, such as the concentration of PVAc during saponification and molar ratio of sodium hydroxide in terms of vinyl acetate units, as shown in Table 1.

Production Example 35

Production of PVA 35

PVA 35 was produced in the same manner of Example 2 in JP 59-155408A. The production conditions are shown in Table 1 and the type of the unsaturated monomer having a POA group used for polymerization is in Table 2, respectively.

Production Example 36

Production of PVA 36

PVA 36 was produced in the same manner of Example 3 in JP 59-155408A. The production conditions are shown in Table 1 and the type of the unsaturated monomer having a POA group used for polymerization is in Table 2, respectively.

Production Example 37

Production of PVA 37

PVA 37 was produced in the same manner of Example 1 in JP 11-236419A. The production conditions are shown in Table 1 and the type of the unsaturated monomer having a POA group used for polymerization is in Table 2, respectively.

Production Example 38

Production of PVA 38

PVA 38 was produced in the same manner of Example 7 in JP 2001-019720A. The production conditions are shown in Table 1 and the type of the unsaturated monomer having a POA group used for polymerization is in Table 2, respectively.

TABLE 1

| | | Condition of Producing POA Modified PVA | | | | | | |
|---|---|---|---|---|---|---|---|---|
| | | Initial Charge | | | | | | Saponification Condition |
| Production Example Nos. | POA modified PVA | Vinyl Acetate (part) | Methanol (part) | Unsaturated Monomer type | Unsaturated Monomer (part) | Polymerization Ratio (%) | PVAc concentration (%) | NaOH molar ratio[1] (mol %) |
| Production Example 1 | PVA1 | 750 | 250 | A | 17.6 | 35 | 20 | 0.1000 |
| Production Example 2 | PVA2 | 400 | 600 | A | 13 | 50 | 20 | 0.1000 |
| Production Example 3 | PVA3 | 550 | 450 | A | 11.7 | 30 | 20 | 0.1000 |

TABLE 1-continued

Condition of Producing POA Modified PVA

| Production Example Nos. | POA modified PVA | Initial Charge | | | | Polymerization Ratio (%) | Saponification Condition | |
|---|---|---|---|---|---|---|---|---|
| | | Vinyl Acetate (part) | Methanol (part) | Unsaturated Monomer type | Unsaturated Monomer (part) | | PVAc concentration (%) | NaOH molar ratio[1] (mol %) |
| Production Example 4 | PVA4 | 900 | 100 | A | 21.5 | 35 | 20 | 0.1000 |
| Production Example 5 | PVA5 | 950 | 50 | A | 14.8 | 20 | 20 | 0.1000 |
| Production Example 6 | PVA6 | 100 | 900 | A | 4.5 | 80 | 20 | 0.1000 |
| Production Example 7 | PVA7 | 1000 | 0 | A | 8 | 5 | 20 | 0.1000 |
| Production Example 8 | PVA8 | 550 | 450 | A | 11.8 | 30 | 20 | 0.0075 |
| Production Example 9 | PVA9 | 550 | 450 | A | 11.8 | 30 | 20 | 0.0020 |
| Production Example 10 | PVA10 | 550 | 450 | A | 11.8 | 30 | 20 | 0.0010 |
| Production Example 11 | PVA11 | 750 | 250 | A | 9.9 | 40 | 20 | 0.1000 |
| Production Example 12 | PVA12 | 750 | 250 | A | 4.9 | 40 | 20 | 0.1000 |
| Production Example 13 | PVA13 | 750 | 250 | A | 3.9 | 40 | 20 | 0.1000 |
| Production Example 14 | PVA14 | 750 | 250 | C | 97.4 | 40 | 20 | 0.1000 |
| Production Example 15 | PVA15 | 750 | 250 | C | 235 | 40 | 20 | 0.1000 |
| Production Example 16 | PVA16 | 750 | 250 | B | 7.4 | 40 | 20 | 0.1000 |
| Production Example 17 | PVA17 | 750 | 250 | C | 6.1 | 40 | 20 | 0.1000 |
| Production Example 18 | PVA18 | 750 | 250 | D | 4.9 | 40 | 20 | 0.1000 |
| Production Example 19 | PVA19 | 750 | 250 | E | 3.7 | 40 | 20 | 0.1000 |
| Production Example 20 | PVA20 | 750 | 250 | F | 11.2 | 40 | 20 | 0.1000 |
| Production Example 21 | PVA21 | 750 | 250 | G | 13.5 | 40 | 20 | 0.1000 |
| Production Example 22 | PVA22 | 750 | 250 | H | 14.8 | 40 | 20 | 0.1000 |
| Production Example 23 | PVA23 | 750 | 250 | I | 32 | 40 | 20 | 0.1000 |
| Production Example 24 | PVA24 | 750 | 250 | J | 78 | 40 | 20 | 0.1000 |
| Production Example 25 | PVA25 | 750 | 250 | K | 14.9 | 40 | 20 | 0.1000 |
| Production Example 26 | PVA26 | 750 | 250 | L | 7.4 | 40 | 20 | 0.1000 |
| Production Example 27 | PVA27 | 750 | 250 | M | 9.9 | 40 | 20 | 0.1000 |
| Production Example 28 | PVA28 | 750 | 250 | N | 11.2 | 40 | 20 | 0.1000 |
| Production Example 29 | PVA29 | 700 | 300 | — | — | 25 | 20 | 0.1000 |
| Production Example 30 | PVA30 | 550 | 450 | — | — | 40 | 20 | 0.1000 |
| Production Example 31 | PVA31 | 350 | 650 | — | — | 40 | 20 | 0.1000 |
| Production Example 32 | PVA32 | 800 | 200 | — | — | 20 | 15 | 0.1000 |
| Production Example 33 | PVA33 | 950 | 50 | — | — | 5 | 10 | 0.1000 |
| Production Example 34 | PVA34 | 980 | 20 | — | — | 2 | 5 | 0.1000 |
| Production Example 35 | PVA35 | 900 | 105 | O | 415 | 70 | 40 | 0.0200 |
| Production Example 36 | PVA36 | 900 | 105 | P | 47.8 | 70 | 40 | 0.0200 |
| Production Example 37 | PVA37 | 1875 | 625 | Q | 99 | 75 | 30 | 0.0250 |
| Production Example 38 | PVA38 | 1900 | 100 | R | 236.4 | 40 | 20 | 0.0200 |

[1] Molar ratio of sodium hydroxide (NaOH) relative to vinyl acetate units in POA modified PVAc.
[2] In all Production Examples, 0.25 parts by weight of 2,2'-azobisisobutyronitrile (AIBN) was used as a polymerization initiator.

TABLE 2

Unsaturated Monomer having POA Group (Functional Groups and Number of Repeating Unit corresponding to General Formula (II))

| Monomer | R1 | R2 | R3 | R4 | X | m | n |
|---|---|---|---|---|---|---|---|
| A | —H | —H | —H | —CH$_3$ | —CO—NH— | 2 | 13 |
| B | —H | —H | —H | —CH$_3$ | —CO—NH— | 2 | 9 |
| C | —H | —H | —H | —CH$_3$ | —CO—NH— | 2 | 6 |
| D | —H | —H | —H | —CH$_3$ | —CO—NH— | 2 | 4 |
| E | —H | —H | —H | —CH$_3$ | —CO—NH— | 2 | 2 |
| F | —H | —H | —H | —CH$_3$ | —CO—NH— | 2 | 16 |
| G | —H | —H | —H | —CH$_3$ | —CO—NH— | 2 | 19 |
| H | —H | —H | —H | —CH$_3$ | —CO—NH— | 2 | 21 |
| I | —H | —H | —H | —H | —O— | 2 | 10 |
| J | —H | —H | —H | —CH$_2$—COONa | —CH$_2$—O— | 2 | 12 |
| K | —H | —H | —COONa | —H | —CO—NH— | 2 | 13 |
| L | —H | —H | —H | —CH$_3$ | —CO—NH— | 20 | 0 |
| M | —CH$_3$ | —H | —H | —CH$_3$ | —CO—NH— | 20 | 0 |
| N | none | —H | —H | —CH$_3$ | —CO—NH— | 0 | 17 |
| O | —H | —H | —H | —H | —CH$_2$—O— | 15 | 0 |
| P | —CH$_3$ | —H | —H | —H | —CH$_2$—O— | 10 | 0 |
| Q | —H | —CH$_3$ | —H | —H | —O— | 10 | 0 |
| R | —H | —CH$_3$ | —H | —CO—OCH$_3$ | —CH$_2$—O— | 36 | 0 |

Examples 1 Through 19 and Comparative Examples 1 Through 19

Results of the above evaluation for PVAs 1 through 38 are shown in Table 3 and Table 4.

TABLE 3

Results of Measuring Physical Properties of POA Modified PVA

| | POA modified PVA | Polymerization Result | | | | Result of PVA Evaluation | | |
|---|---|---|---|---|---|---|---|---|
| | | Viscosity Average Degree of Polymerization P | Amount S of POA Modification (mol %) | Degree of Saponification (mol %) | Content of Monomer (parts by weight) | Solubility | Viscosity $\eta_1$ at 20° C.*) (mPa·s) | Viscosity $\eta_2$ at 40° C. (mPa·s) |
| Example 1 | PVA1 | 1760 | 0.4 | 98.7 | 10.0 | A | 12000 | 60000 |
| Example 2 | PVA2 | 520 | 0.4 | 98.7 | 10.0 | A | 120 | 350 |
| Example 3 | PVA3 | 1050 | 0.4 | 98.8 | 10.0 | A | 420 | 1200 |
| Example 4 | PVA4 | 2450 | 0.4 | 98.9 | 10.0 | A | 60000 | >100000 |
| Example 5 | PVA5 | 3500 | 0.4 | 98.9 | 10.0 | A | >100000 | >100000 |
| Example 6 | PVA7 | 4800 | 0.4 | 98.5 | 10.0 | A | >100000 | >100000 |
| Example 7 | PVA8 | 1030 | 0.4 | 89.8 | 8.5 | A | 650 | 1600 |
| Example 8 | PVA9 | 1040 | 0.4 | 32.1 | 3.1 | C | 860 | 2200 |
| Example 9 | PVA11 | 1750 | 0.2 | 98.9 | 5.3 | A | 800 | 2400 |
| Example 10 | PVA12 | 1700 | 0.1 | 98.6 | 2.7 | A | 120 | 220 |
| Example 11 | PVA14 | 1730 | 5 | 98.2 | 45.7 | C | 42000 | >100000 |
| Example 12 | PVA16 | 1750 | 0.2 | 98.9 | 4.1 | A | 580 | 1400 |
| Example 13 | PVA17 | 1730 | 0.2 | 98.7 | 3.2 | A | 360 | 920 |
| Example 14 | PVA18 | 1700 | 0.2 | 98.4 | 2.6 | A | 120 | 350 |
| Example 15 | PVA20 | 1680 | 0.2 | 98.5 | 6.1 | B | 1400 | 3200 |
| Example 16 | PVA21 | 1680 | 0.2 | 98.6 | 7.0 | C | 3500 | 8900 |
| Example 17 | PVA23 | 1680 | 0.2 | 98.3 | 3.5 | A | 710 | 1800 |
| Example 18 | PVA24 | 1720 | 0.2 | 98.4 | 4.2 | A | 800 | 2100 |
| Example 19 | PVA25 | 1680 | 0.2 | 98.7 | 5.5 | A | 920 | 1600 |

| | Result of PVA Evaluation | | | Result of Film Evaluation | | | |
|---|---|---|---|---|---|---|---|
| | Viscosity Ratio $\eta_2/\eta_1$ | Comparison to Viscosity $\eta_3$ of Unmodified PVA | | Solubility | Equilibrium Moisture Content (%) | Tensile Elastic Modulus (kg/mm²) | Contact Angle to Water (°) |
| | | Viscosity Ratio $\eta_1/\eta_3$ | Compared $\eta_3$ | | | | |
| Example 1 | 5.0 | 428.6 | Comparative Example 10 | A | A | B | 75.1 |
| Example 2 | 2.9 | 20.0 | Comparative Example 12 | A | A | B | 73.2 |
| Example 3 | 2.9 | 38.2 | Comparative Example 11 | A | A | B | 74.5 |
| Example 4 | >1.6 | 1091 | Comparative Example 13 | A | A | A | 76.2 |
| Example 5 | — | >3125 | Comparative Example 14 | A | A | B | 76.3 |
| Example 6 | — | >238 | Comparative Example 15 | A | A | B | 77.1 |
| Example 7 | 2.5 | 59.1 | Comparative Example 11 | A | A | C | — |
| Example 8 | 2.6 | 78.2 | Comparative Example 11 | — | — | — | — |
| Example 9 | 3.0 | 28.6 | Comparative Example 10 | A | A | B | 73.2 |
| Example 10 | 1.8 | 4.3 | Comparative Example 10 | A | B | A | 72.1 |
| Example 11 | >2.3 | 1500 | Comparative Example 10 | B | A | A | 78.1 |
| Example 12 | 2.4 | 20.7 | Comparative Example 10 | A | A | B | 73.2 |
| Example 13 | 2.6 | 12.9 | Comparative Example 10 | A | B | B | 74.1 |
| Example 14 | 2.9 | 4.3 | Comparative Example 10 | A | B | B | 73.6 |
| Example 15 | 2.3 | 50.0 | Comparative Example 10 | B | A | A | 73.5 |
| Example 16 | 2.5 | 125.0 | Comparative Example 10 | B | A | A | 73.1 |
| Example 17 | 2.5 | 25.4 | Comparative Example 10 | A | A | B | 74.2 |
| Example 18 | 2.6 | 28.6 | Comparative Example 10 | A | B | A | 74.1 |
| Example 19 | 1.7 | 32.9 | Comparative Example 10 | A | A | B | 73.9 |

Measurement limit of viscosity is 100000 mPa·s

*)$\eta_3$ in Comparative Examples 10 through 15

TABLE 4

Results of Measuring Physical Properties of POA Modified PVA

| | POA modified PVA | Polymerization Result | | | | Result of PVA Evaluation | | |
|---|---|---|---|---|---|---|---|---|
| | | Viscosity Average Degree of Polymerization P | Amount S of POA Modification (mol %) | Degree of Saponification (mol %) | Content of Monomer (parts by weight) | Solubility | Viscosity $\eta_1$ at 20° C.*) (mPa·s) | Viscosity $\eta_2$ at 40° C. (mPa·s) |
| Comparative Example 1 | PVA6 | 90 | 0.4 | 98.6 | 10.0 | A | 10 | 8 |
| Comparative Example 2 | PVA10 | 1040 | 0.4 | 18 | 3.4 | E | — | — |
| Comparative Example 3 | PVA13 | 1720 | 0.08 | 98.5 | 2.1 | A | 30 | 28 |
| Comparative Example 4 | PVA15 | 1680 | 12 | 98 | 68.0 | E | — | — |
| Comparative Example 5 | PVA19 | 1720 | 0.2 | 98.6 | 2.0 | A | 34 | 25 |
| Comparative Example 6 | PVA22 | 1700 | 0.2 | 98.8 | 7.5 | D | 6300 | 15000 |
| Comparative Example 7 | PVA26 | 1700 | 0.4 | 98.5 | 9.8 | A | 26 | 21 |
| Comparative Example 8 | PVA27 | 1700 | 0.4 | 98.5 | 7.7 | A | 27 | 22 |
| Comparative Example 9 | PVA28 | 1700 | 0.4 | 98.5 | 11.2 | D | 4500 | 9800 |
| Comparative Example 10 | PVA29 | 1700 | — | 98.5 | — | — | 28 | — |
| Comparative Example 11 | PVA30 | 1000 | — | 98.4 | — | — | 11 | — |
| Comparative Example 12 | PVA31 | 500 | — | 98.6 | — | — | 6 | — |
| Comparative Example 13 | PVA32 | 2400 | — | 98.5 | — | — | 55 | — |
| Comparative Example 14 | PVA33 | 3500 | — | 98.6 | — | — | 132 | — |
| Comparative Example 15 | PVA34 | 4800 | — | 98.4 | — | — | 420 | — |
| Comparative Example 16 | PVA35 | 420 | 4.1 | 99.0 | — | — | — | — |
| Comparative Example 17 | PVA36 | 480 | 2.9 | 89.2 | — | — | — | — |
| Comparative Example 18 | PVA37 | 1300 | 0.4 | 99.5 | — | — | — | — |
| Comparative Example 19 | PVA38 | 2500 | 2.0 | 96.0 | — | — | — | — |

| | Result of PVA Evaluation | | | Result of Film Evaluation | | |
|---|---|---|---|---|---|---|
| | Viscosity Ratio $\eta_2/\eta_1$ | Comparison to Viscosity $\eta_3$ of Unmodified PVA | | Solubility | Equilibrium Moisture Content (%) | Tensile Elastic Modulus (kg/mm²) | Contact Angle to Water (°) |
| | | Viscosity Ratio $\eta_1/\eta_3$ | Compared $\eta_3$ | | | | |
| Comparative Example 1 | 0.8 | — | — | A | A | — | 73.5 |
| Comparative Example 2 | — | — | — | — | — | — | — |
| Comparative Example 3 | 0.9 | 1.1 | Comparative Example 10 | A | D | A | 68.2 |
| Comparative Example 4 | — | — | — | — | — | — | — |
| Comparative Example 5 | 0.7 | 1.2 | Comparative Example 10 | A | D | A | 67.2 |
| Comparative Example 6 | 2.4 | 225.0 | Comparative Example 10 | C | A | A | 75.3 |
| Comparative Example 7 | 0.8 | 0.9 | Comparative Example 10 | — | — | — | 60.2 |
| Comparative Example 8 | 0.8 | 1.0 | Comparative Example 10 | — | — | — | 62.1 |
| Comparative Example 9 | 2.2 | 160.7 | Comparative Example 10 | — | — | — | 74.1 |
| Comparative Example 10 | — | — | — | A | D | A | 54.2 |
| Comparative Example 11 | — | — | — | A | D | A | 53.2 |
| Comparative Example 12 | — | — | — | A | D | A | 54.5 |
| Comparative Example 13 | — | — | — | A | D | A | 56.2 |
| Comparative Example 14 | — | — | — | A | D | A | 56.1 |
| Comparative Example 15 | — | — | — | B | D | A | 55.9 |
| Comparative Example 16 | — | — | — | A | D | D | 63.2 |
| Comparative Example 17 | — | — | — | A | D | D | — |
| Comparative Example 18 | — | — | — | A | D | D | 58.2 |
| Comparative Example 19 | — | — | — | A | D | D | 62.5 |

Since PVA 10 and PVA 15 were not soluble in water, the viscosity measurement was not carried out and no film was able to be produced from the aqueous solutions.
Since the film strength of PVA 6 was seriously little, the tensile test was not able to be carried out.
Measurement limit of viscosity is 100000 mPa·s
*)$\eta_3$ in Comparative Examples 10 through 15

POA modified PVA of the present invention is excellent in solubility, and further has higher viscosity compared to unmodified PVA having an equivalent degree of polymerization. In addition, compared to an aqueous solution viscosity at 20° C., it has a characteristic of having a higher aqueous solution viscosity at 40° C. Further, compared with polyethylene oxide modified PVA (Comparative Example 7) and polypropylene oxide modified PVA (Comparative Example 8), it also has a characteristic of having a greater contact angle to water. However, in a case of m=0, even when the value of n is within a range of $3 \leq n \leq 20$, the POA modified PVA thus obtained has low water solubility and an insoluble matter was found in the aqueous solution (Comparative Example 9).

Although the water solubility of the film is basically in good both Examples and Comparative Examples, the PVA thus obtained itself had poor water solubility in PVA 10 having the degree of saponification of lower than 20 (Comparative Example 2) and in PVA 15 having the amount S of modification of polyoxyalkylene of more than 10 mol % (Comparative Example 4), so that it was not possible to produce a film from the aqueous solutions. In addition, in PVA 22 having the number n of polyoxybutylene group units of greater than 20 (Comparative Example 6) among the polyoxyalkylene groups, the water solubility was decreased.

The equilibrium moisture content of the film was generally good in Examples compared to Comparative Examples. That is, it signifies that the absorption of moisture in high humidity (85% RH) is low and the films of the present invention do not easily absorb moisture particularly in high humidity compared to PVAs 35 through 38 (Comparative Examples 16 through 19) containing conventionally known polyoxyalkylene groups. In addition, even when compared to unmodified PVAs of complete saponification (Comparative Examples 10 through 15), it signifies that the moisture content is low and the films of the present invention are extremely excellent in resistance in the absorption of moisture.

Tensile elastic modulus of a film, in a case of a PVA film in general, largely depends on the humidity environment in which the film is left, and may decrease seriously in high humidity in particular. Conventionally, in PVAs 35 through 38 containing known polyoxyalkylene groups (Comparative Examples 16 through 19), the tensile elastic modulus is extremely low. In contrast, in Examples, the results were generally good. That is, the decrease of the tensile elastic modulus was less in high humidity and these results were approximately same level as the unmodified PVAs of complete saponification (Comparative Examples 10 through 15).

As a result of evaluating the water repellency of a film by way of a contact angle upon dropping a water droplet on the film surface, the contact angles of the films of the present invention indicated the numerical values obviously high compared to the contact angles of PVAs 35, 37, and 38 containing conventionally known polyoxyalkylene groups (Comparative Examples 16, 18, and 19) and unmodified PVAs of complete saponification (Comparative Examples 10 through 15). That is, it signifies that a film of the present invention is excellent in water repellency.

The invention claimed is:

1. A polyoxyalkylene modified vinyl alcohol-based polymer, comprising:

a polyoxyalkylene group according to general formula (I) as a side chain;

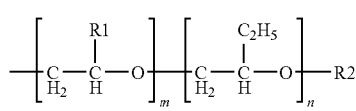

wherein:

R1 is a hydrogen atom or a methyl group;

R2 is a hydrogen atom or an alkyl group having a carbon number of from 1 to 8;

each of m and n is a number of repeating units of respective oxyalkylene units;

$1 \leq m \leq 10$;

$3 \leq n \leq 20$;

the polymer has a viscosity average degree of polymerization P of from 200 to 5000;

the polymer has a degree of saponification of from 20 to 99.99 mol %; and the polymer has an amount S of polyoxyalkylene modification of from 0.1 to 10 mol %.

2. The polyoxyalkylene modified vinyl alcohol-based polymer according to claim 1, wherein the polymer contains from 2.5 to 50 parts by weight of a monomer having the polyoxyalkylene group represented by general formula (I) relative to 100 parts by weight of a main chain of the polymer.

3. The polyoxyalkylene modified vinyl alcohol-based polymer according to claim 1, wherein the polymer has a degree of saponification of from 80 to 99.99 mol %.

4. The polyoxyalkylene modified vinyl alcohol-based polymer according to claim 1, wherein the polymer has a degree of saponification of from 98 to 99.99 mol %.

5. The polyoxyalkylene modified vinyl alcohol-based polymer according claim 1, wherein the polymer has a viscosity average degree of polymerization P of from 500 to 5000.

6. A film comprising the polyoxyalkylene modified vinyl alcohol-based polymer according to claim 1.

7. The film according to claim 6, wherein a contact angle of water to the film is 65° or more.

8. A method of producing the polyoxyalkylene modified vinyl alcohol-based polymer according to claim 1, comprising:

copolymerizing an unsaturated monomer according to general formula (II) and a vinyl ester-based monomer to obtain a polyoxyalkylene modified vinyl ester-based copolymer; and

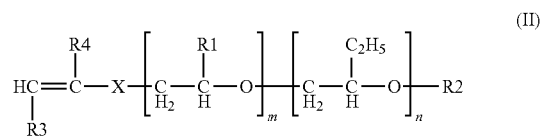

saponifying the polyoxyalkylene modified vinyl ester-based copolymer;

wherein:

R1 is a hydrogen atom or a methyl group;

R2 is a hydrogen atom or an alkyl group having a carbon number of from 1 to 8;

each of m and n is a number of repeating units of respective oxyalkylene units;

$1 \leq m \leq 10$;

$3 \leq n \leq 20$;

R3 is a hydrogen atom or a —COOM group, where M is a hydrogen atom, an alkali metal, or an ammonium group;

R4 is a hydrogen atom, a methyl group, or a —CH$_2$—COOM group, where M is a hydrogen atom, an alkali metal, or an ammonium group; and X is —O—, —CH$_2$—O—, —CO—, —(CH$_2$)$_k$—, —CO—O—, or —CO—NR5-, where R5 is a saturated alkyl group having a carbon number of from 1 to 4 or a hydrogen atom, k is a number of repeating units of a methylene unit, and $1 \leq k \leq 15$.

9. The method of producing the polyoxyalkylene modified vinyl alcohol-based polymer according to claim 8, wherein:

the unsaturated monomer represented by general formula (II) is an unsaturated monomer represented by general formula (III);

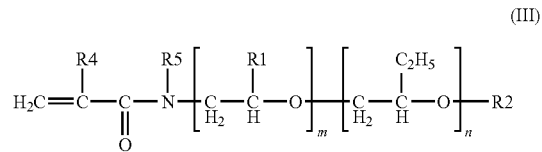

R1 is a hydrogen atom or a methyl group;

R2 is a hydrogen atom or an alkyl group having a carbon number of from 1 to 8;

each of m and n is a number of repeating units of respective oxyalkylene units;

$1 \leq m \leq 10$;

$3 \leq n \leq 20$;

R4 is a hydrogen atom, a methyl group, or a —CH$_2$—COOM group, where M is a hydrogen atom, an alkali metal, or an ammonium group; and R5 is a saturated alkyl group having a carbon number of from 1 to 4 or a hydrogen atom.

10. A method of producing a film, comprising preparing the film from a polyoxyalkylene modified vinyl alcohol-based polymer obtained by the method according to claim 8.

* * * * *